(No Model.) 2 Sheets—Sheet 1.

A. MUIR.
COUPLING SHAFTING.

No. 297,153. Patented Apr. 22, 1884.

(No Model.) 2 Sheets—Sheet 2.

A. MUIR.
COUPLING SHAFTING.

No. 297,153. Patented Apr. 22, 1884.

Witnesses
J. J. Sheehy
Wm Read

Inventor
Alfred Muir
by W. H. Babcock
Attorney

N. PETERS. Photo-Lithographer. Washington. D. C.

UNITED STATES PATENT OFFICE.

ALFRED MUIR, OF MANCHESTER, COUNTY OF LANCASTER, ENGLAND.

COUPLING SHAFTING.

SPECIFICATION forming part of Letters Patent No. 297,153, dated April 22, 1884.

Application filed December 19, 1883. (No model.) Patented in England October 12, 1883, No. 4,865.

*To all whom it may concern:*

Be it known that I, ALFRED MUIR, of the firm of William Muir & Co., a subject of the Queen of Great Britain, residing at Manchester, in the county of Lancaster, England, mechanical engineer, have invented a new and useful Improvement in Coupling Shafting, also applicable to the screws and shafts of lathes and other tools and machines, (for which I have obtained a patent in Great Britain, No. 4,865, bearing date October 12, 1883,) of which the following is a specification.

My invention relates to improvements in coupling shafting, screws and shafts of lathes and machine-tools, and the shafts of cranes and other machines or machinery; and the objects of my invention are, first, to couple solid or tubular shafting without the use of any exterior sleeve or cover, or without necessarily increasing the diameter of the shafts where coupled; secondly, to construct the screw of a lathe, or other long screw or shaft of a machine-tool, machine, crane, or the like, in two or more pieces connected by my improved coupling. I attain these objects in the manner illustrated in the accompanying drawings, in which—

Figure 1:
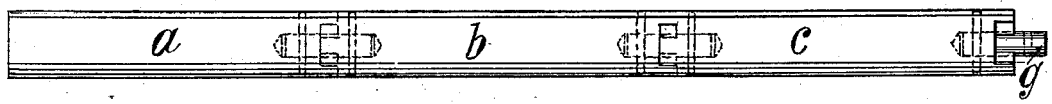
Figure 2:
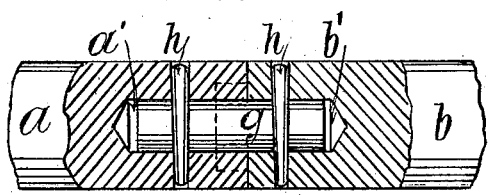
Figure 3:
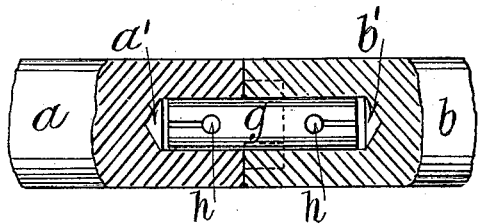
Figure 4:
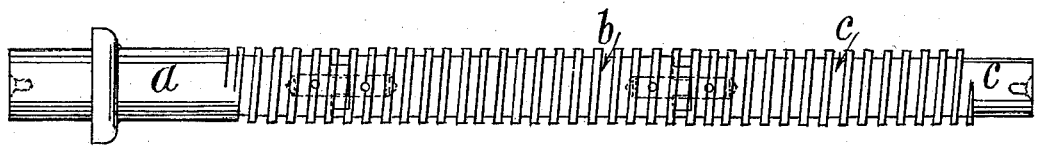
Figure 5:
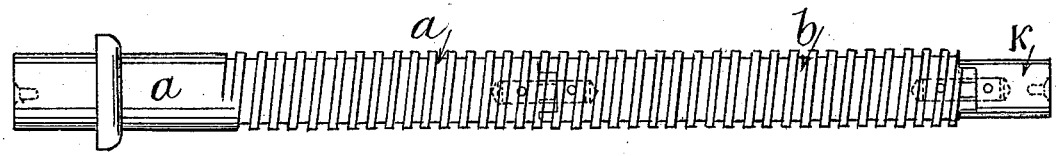
Figure 6:
Figure 7:
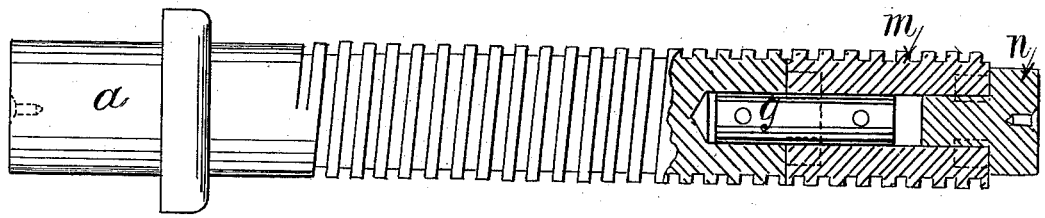
Figure 8:
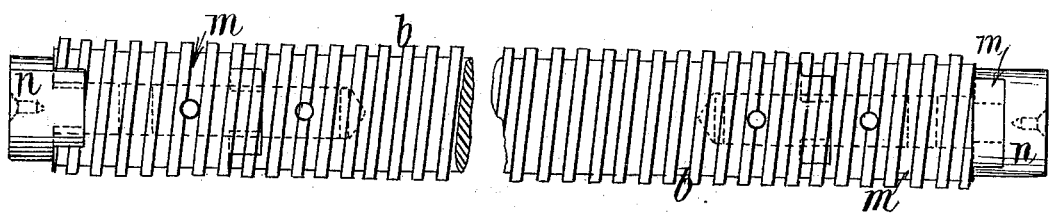
Figure 9:
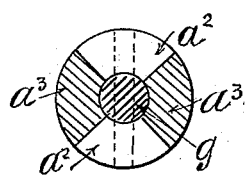
Figure 10:
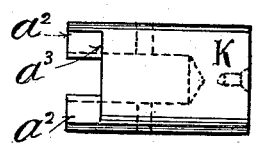
Figure 11:
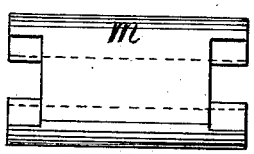
Figure 12:
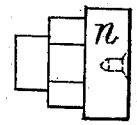
Figures 13, 14:
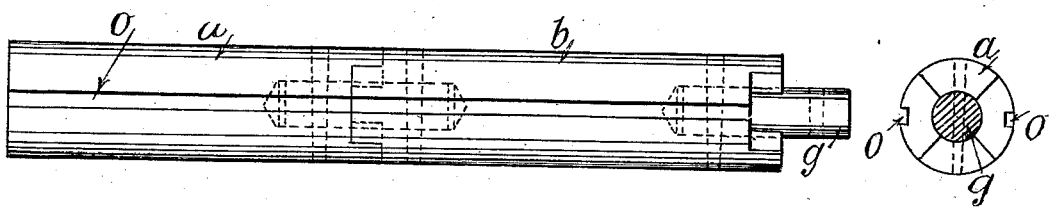

Figure 1 is a view of three lengths or pieces in a line of shafting. Figs. 2 and 3 are views, partly in section, of two shafts coupled. Fig. 4 is a view of a screw of a lathe or other machine composed of three lengths coupled. Fig. 5 is a view of the first and second lengths of the screw coupled to a piece with a center. Fig. 6 is a view of the piece with a center coupled to the second and third lengths. Fig. 7 is a view, partly in section, of the first length or head-stock end of a screw coupled to a short piece, which has a loose plug with a center hole at the other end. Fig. 8 is a view of the middle length of a screw coupled to a short piece at each end, each short piece having a loose plug with a center hole. Fig. 9 is an end view of a shaft or screw prepared for coupling. Fig. 10 is a view of a short piece with a center hole. Fig. 11 is a view of a short piece prepared for coupling at each end, and Fig. 12 is a view of a loose plug with a center hole. Fig. 13 is a view of two lengths of a shaft with two key-ways, and Fig. 14 an end view of the same.

Similar letters refer to similar parts throughout the several views.

In Fig. 1, $a$, $b$, and $c$ are three lengths of solid shafting coupled. Figs. 2 and 3 are views of the two lengths $a$ and $b$, showing the manner in which the coupling is effected. The lengths $a$ and $b$ are first turned in the ordinary manner. Holes $a'$ and $b'$, respectively, are then drilled in them to receive the stud $g$. The end to be coupled of the shaft $a$ is cut across, so as to form two projections, $a^2$, and two recess, $a^3$, as shown in Figs. 7 and 8, which correspond with and fit into similar projections and recesses formed at the end of the shaft $b$. Two projections and two recesses at the end of each shaft, divided by radial lines, (see Fig. 7,) are shown and described; but the number may be varied, if desired. Taper holes are drilled through each length $a$ and $b$ and through the stud $g$. When the ends of the lengths are brought together, taper pins $h$ are driven through these holes in the ends of the shafts $a$ and $b$, and through the stud $g$, thus completing the coupling. The other end of the length $b$ is coupled in a similar manner to the length $c$, and additional lengths may be coupled as required.

Tubular or hollow shafting can be coupled in the manner described as readily as solid shafting, the studs $g$ being fitted into the ends of the hollow shafts. The stud $g$ and taper pins $h$ are not absolutely essential features of the coupling; but they are convenient for holding the separate lengths of shafting together.

In order to make all the couplings alike, it is desirable to work with two templets similar to the piece $k$. (See Fig. 10.)

In Figs. 4 to 6, $a\ b\ c$ are three lengths of a lathe-screw shown coupled together in Fig. 4. In these views $a$ is the end of the screw, which works in a bearing near the head-stock. $b$ is the middle length, prepared at one end to couple to the length $a$ and at the other end to the length $c$, which forms or may form one end of the screw. The couplings are made exactly as described with reference to Figs. 1 to 3.

To make, say, a left-hand screw of two or more pieces or lengths, I proceed in the following manner: I take the head-stock end or first length, $a$, of a "turned" shaft and couple to it another length of turned shaft, $b$, prepared for coupling at both ends in the manner already described. These two lengths $a$ and $b$, with a short piece, $k$, (shown detached in Fig. 10,) coupled to the end of the latter, are put into a lathe to have the screw-thread cut on them. (See Fig. 5.) When this is done, the two lengths are uncoupled, the length $a$ removed, and the short piece $k$ substituted and coupled to the other end of the length $b$. A third and last length, $c$, is then coupled to the length $b$, (see Fig. 6,) and the pieces put into the lathe, where the screw-thread is continued from the length $b$ and cut in the length $c$. As many lengths as are required may be prepared and finished in this manner. The lengths $a$, $b$, and $c$, when finished, are coupled together, as previously described, (see Fig. 4,) and one continuous screw of any desired length is thus formed.

The method described is a simple and convenient manner of constructing a screw formed of several lengths; but it requires a lathe rather longer between the centers than is sufficient to take in two lengths of the screw.

An alternative mode of cutting the continuous screw-thread on the several lengths forming the screw is to employ one or more pieces with center holes for the lathe-centers, and to couple in turn such piece or pieces to the end or ends of each of the various lengths from which the screw is to be made. I proceed in the following manner, as illustrated by Figs. 7 and 8: The first length, $a$, is coupled to one end of a short piece, $m$, the other end of which is coupled to a center plug, $n$; or, instead of the plug $n$, (shown detached in Fig. 12,) the center piece, $k$, might be used. These pieces are then put in a lathe and the screw-thread cut across the length $a$ and the short piece $m$. (See Fig. 7.) The length of the surface of this piece $m$ must be an exact multiple of the pitch of the thread. The length $a$ is now finished, and after being taken out of the lathe the piece $m$, with the plug $n$, is coupled to the left-hand end of the length $b$, and a second piece $m$ and plug $n$ are coupled to the right-hand end, and the pieces put in the lathe. The length $b$ has the screw-thread cut in continuation of that in the first piece $m$ across it and the second piece $m$, as shown in Fig. 8. When the thread is cut, the pieces shown in Fig. 8 are removed from the lathe, the plug $n$ is taken out and coupled to the other end of the second piece $m$, which is then coupled to the last length, $c$, and the screw-thread is cut, starting from the piece $m$ across the length $c$. The three lengths $a\ b\ c$ can now be coupled so as to form a continuous screw.

The short piece or pieces $m$, which are used to hold the different lengths $a\ b\ c$ in the lathe when only one length is finished at a time, must be prepared with a coupling at each end, and a center plug, $n$, is coupled to either end, as required.

Screws for machines made of two or more pieces possess many advantages, as in case of wear or damage an old piece can be replaced by a new one, the length of a screw can be increased or decreased, and screws of great length can be made in a lathe of moderate dimensions. Lathe or other machine screws composed of several pieces or lengths, in the manner described, should be held at each end, so as to relieve the taper pins $h$ of all "end-thrust" or "pull."

Shafts with long keyways or grooves for lathes, machine-tools, cranes, and the like can be constructed of several lengths coupled in the manner previously described, and as shown in Figs. 13 and 14. Each length is coupled to a templet in which a keyway or keyways are cut, and is then put on a planer or other suitable machine, and a keyway or keyways, O, are cut in the length to correspond with the keyway or keyways in the templet. After this operation, the lengths $a$ and $b$ are coupled, as shown in Fig. 13, and the shaft, with a continuous keyway or keyways, is completed. The shaft, when working, must be supported in bearings at the ends to relieve the coupling of any end-thrust or pull.

My improved coupling may be applied to shafts of square or other section.

In making and transporting the screws and shafts of large lathes and other machines, considerable difficulty and expense are experienced, owing to the length and bulk of such pieces; but it is obvious that when made of short lengths, coupled in the manner described, these and similar difficulties are overcome.

I am aware that prior to my invention a clutch somewhat similar to my improved coupling has been used on various machines. In such cases the clutch has generally been formed in two separate pieces secured on the ends of the shafts, and in cases where it has been formed with the shafts it has always been applied as a clutch for connecting shafts with each other or with wheels, so as to be disengaged at pleasure. I therefore do not claim such a clutch; but What I do claim as my invention, and desire to secure by Letters Patent of the United States, is—

1. A coupling for sections of shafts and other bodies, consisting of interlocking projections and recesses formed in the proximate ends thereof, in combination with a stud fitted into central recesses in said ends, and pins extending transversely through said sections and stud on each side of the joint, the surface of said sections being flush and unbroken.

2. A shaft-coupling or coupling for other bodies, consisting of sections having their proximate ends formed with interlocking projections and recesses, said projections and recesses being bounded at the sides by radial lines, substantially as set forth.

The foregoing specification of my improvement in coupling shafting, also applicable to the screws and shafts of lathes and other tools and machines, signed by me this 3d day of December, 1883.

ALFRED MUIR.

Witnesses:
  H. B. BARLOW,
  S. WALKEY GILLETT,
Both of 4 Mansfield Chambers, St. Ann's Square, Manchester.